Jan. 7, 1964
P. M. HOLL
3,116,604
ENGINE EXHAUST SYSTEM
Filed May 17, 1962
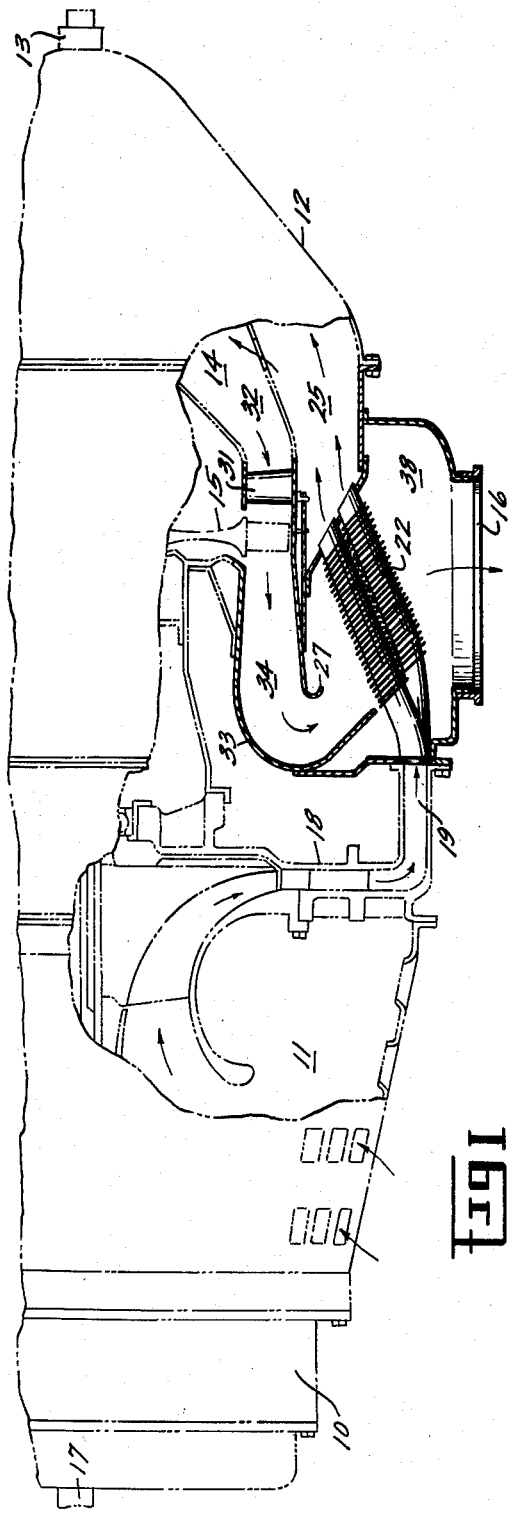
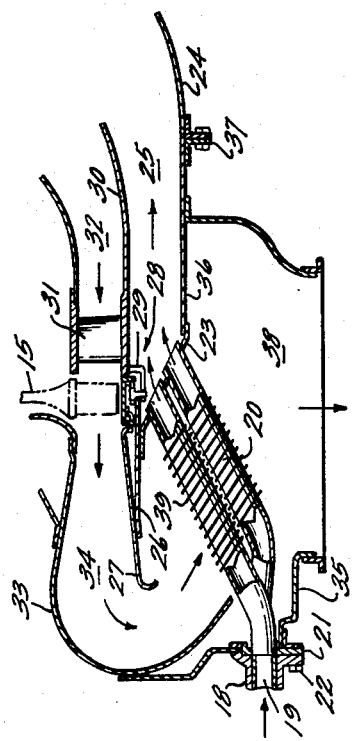
INVENTOR.
PETER M. HOLL
BY
ATTORNEY-

United States Patent Office 3,116,604
Patented Jan. 7, 1964

3,116,604
ENGINE EXHAUST SYSTEM
Peter Matthew Holl, Walnut Creek, Calif., assignor to General Electric Company, a corporation of New York
Filed May 17, 1962, Ser. No. 195,487
6 Claims. (Cl. 60—39.31)

The present invention relates to an engine exhaust system and, more particularly, to such a system that is particularly adaptable to a reverse flow gas turbine engine.

Small gas turbine power plants that are compact and that must be made lightweight and cheap encounter problems in ducting the exhaust gases through the engine. The power plant that is contemplated is of the reverse flow type wherein the air is ducted to a combustor on the aft end of the engine and then reverses direction to flow forwardly in a concentric path through the turbine and is ducted overboard. A typical power plant of the general configuration for which the instant invention is applicable is shown in U.S. Patent 2,553,867. The nature of such an engine creates problems in the compressor and turbine exhaust ducting in order to fit this configuration and keep aerodynamic losses to a minium due to obstructions or turning of the exhaust gases. In such engines, it is conventional to use struts to support the various parts of the engine. However, because of the reverse flow arrangement such struts must, of necessity, at some place be in the path of the gas flow and create an obstruction thereto. It is thus desirable to minimize the obstructing structure as much as possible and still provide the support necessary for various components of the power plant. Furthermore, rigid support is essential from the standpoint of the close location tolerances that are required between the stationary and rotating components. Therefore, it is desirable to use the parts as multifunction components as much as possible and still provide the necessary rigidity and rotating clearance as well as low aerodynamic losses.

The main object of the invention is to provide an engine exhaust system that uses a minimum of parts and uses a single piece of structure as the main support for its own components and parts aft of the exhaust system.

Another object is to provide such a system wherein a single structural support member is used to carry the whole engine weight aft of the compressor and this support is a multipurpose member.

A further object of the invention is to provide such a system wherein the main support is obtained from a single support structure that is rigid for the tolerances required, that is cooled to reduce its average temperature, that recovers a portion of the heat from the turbine exhaust gas, and that presents a minimum of resistance to the flow of the exhaust gases.

Briefly stated, the invention is directed to an exhaust system for a typical gas turbine engine of the type that has a gear box at one end and a reverse flow combustor at the opposite end with a centrifugal compressor and frame disposed between the two. The compressor induces air flow inwardly at its inner radius and exhausts it radially outward to pass rearwardly to the combustion system wherein it then passes forwardly in a concentric exhaust gas path through a turbine and then radially outward to be discharged. This general arrangement is known. The invention provides a symmetrical arrangement about the engine centerline of a tubular support consisting of tubes that are connected to the frame at one end and angled inwardly toward the engine centerline and connected to a cone member at the other end. The tubes are used for regeneration and the entire combustion system, outer exhaust wall and stationary turbine parts are all carried by the cone member supported by the tubes. Thus, the tubes provide the main structural support, carry air, and act as a heat exchanger.

While the specification concludes with claims particularly pointing out and distinctly claiming the subject matter which I regard as my invention, it is believed the invention will be better understood from the following description taken in connection with the accompanying drawing in which:

FIGURE 1 shows an overall power plant with the structure comprising the instant invention shown in solid lines and the rest in phantom, and FIGURE 2 is an enlarged version in section of the structure of the invention.

Referring to the drawing, a general engine arrangement is shown in FIGURE 1 which is typical of a small turboshaft engine that is operable in the horizontal or vertical direction and includes a gear box 10, compressor section 11, with an outlet to reverse flow combustor 12 having a fuel injector 13 and an igniter (not shown). Combustion gas in combustion area 14 is directed forwardly through turbine 15 and out a suitable exhaust outlet 16 whence it is disposed overboard or used elsewhere. A power takeoff 17 may be provided in any suitable location or locations on gear box 10.

The exhaust system of the instant invention, as shown in the solid lines of the drawing, is supported by an engine frame 18 which, for the engine shown, may be termed a compressor frame since it is the main frame of the engine. It is necessary to support the engine structure aft of frame 18 and at the same time provide ducting to transport air and gas respectively exhausted from the compressor and turbine. Air is discharged from the compressor in the forward portion of frame 18 whence it flows into an annulus 19 substantially around the periphery of the frame and is discharged axially of the engine as shown. The aft parts are supported by a plurality of tubes 20 which may be directly secured to the frame by any suitable means or may be secured by brazing to an attachment flange 21 which, in turn, is secured to the frame 18 by bolts 22. As shown, a plurality of tubes 20 is shown which tubes extend symmetrically about the longitudinal centerline and are angled in a cone pattern toward the engine centerline at the aft end of the tubes. While the angle of the cone of the tubes is not important, it is essential that they be angled in order to provide the rigidity required. Desirably, banks of tubes may be used in a staggered relation, as shown in the drawing, to form a boxlike structure because of the offsetting or staggered relation. The boxlike structure is a more rigid structure than a single row of tubes would provide. When banks are used, the tubes are parallel to one another, as shown, and are brought into flange 21 on the same pitchline to provide a constant area outlet to annulus 19. Support for other parts of the engine is obtained by the attachment of a cone member 23 by any suitable means to the opposite ends of the tubes and cone member 23 is angled in the opposite direction toward the centerline from that of the tubes. It can be seen that a very rigid structure is provided by the cone arrangement of the tubes and the cone member 23 attached thereto. The outer combustion case 24 is secured by an extension 36 to one end of the cone and carried thereby. Thus, air from compressor frame 18 is directed through the tubes and into annular passage 25 to the combustion system.

In order to support the close tolerance parts such as the turbine shroud and nozzle, cone 23 supports, by any suitable intermediate member 26, as shown. It also supports directly, an outer turbine exhaust duct diffuser wall 27 which wall is placed radially inward of the tubes and is thus carried by the cone member. Additionally, the cone member supports and carries the turbine shroud structure generally indicated at 28. The shroud 28 and outer wall 27 are in axial alignment with each other to provide a smooth outer flow path for exhaust gases through turbine 15. Additionally, by a slide-on flange connection 29 the inner combustion liner 30 and turbine nozzle structure 31 are supported. Thus, the reverse flow combustion system is completely supported from cone member 23 and provides concentric air passages 25 and exhaust gas passage 32. To further guide the exhaust gases, an inner turbine exhaust duct diffuser wall 33 is connected to the frame in any suitable manner to define a curved diffuser passage 34 with outer wall 27. The exhaust gases are thus reduced in velocity in passage 34 and the walls 33 and 27 are curved to provide a substantially 180° turn to reverse direction as shown after which the gases pass over tubes 20 for regeneration or heat recovery purposes and are then exhausted. A collector 35 is secured to the frame at one end and to an extension 36 which is effectively a part of cone 23 at the other end. Combustor case 24 is then connected at flange 37. Collector 35 has one or more outlets 38 to duct the gas overboard or to another point of use. It should be noted that collector 35, while being supported by the frame and extension 36 is not a support member, but is merely hung on the frame and extension for the purpose of collecting exhaust gases.

It can be seen that the rigid support structure solely by the tubes 20 permits an exact tolerance between the shroud and turbine and between the turbine nozzle and the turbine because of the rigidity that is present, especially if the staggered tubes or box structure is used. In either case, a rigid structure is provided. Furthermore, the turbine nozzle section is held on by gas pressure and flange 29 is merely a radial locating means for the combustion liner 30 and nozzle 31. Thus, the entire combustion system 12–14 including the outer case 24 and inner liner 30 as well as the stationary turbine parts including shroud 28 and nozzle 31 and the outer diffuser wall 27 are all supported by the main structural support provided by the tubes 20 and the entire structure is mechanically stable and easily fabricated. Furthermore, in addition to the mechanical rigidity it is thermally stable inasmuch as tubes 20 are relatively cool because of the passage of compressor air therethrough. The turbine exhaust gas passing over the outside of the tubes results in an average temperature of the tubes which is relatively low resulting in a stable thermal structure. The concentric flow paths through passages 25 and 32 are stable because they are mounted on the same cone structure 23.

In order to increase the heat recovery or regeneration it may be desirable to provide fins 39 on the tubes oriented in the direction of exhaust gas flow to minimize aerodynamic losses. These fins, combined with the staggered relationship of the tubes, provide a tortuous path and a large heat exchange surface between the turbine exhaust gas and the incoming compressor air.

The use of the tubes to support substantially all the structure aft of the frame results in the tubes having a multipurpose function which is support, conduction of air, and heat exchange. Obviously, the tubes may be changed in shape but are preferably cylindrical. Also, the surface finish and the number and disposition of the tube rows may be varied. With this system the exit is thus strutless except for the tubes which are typical elements in a regenerative system and the tubes perform the function of the usual struts. The combination thus minimizes the actual length of the engine by the concentric axial flow paths and the exhaust duct maximum diameter is maintained no larger than the compressor frame diameter. Because of the coolness of the tubes, mechanical movement of the hot parts is kept at a minimum and stresses are reduced. This permits close clearance between the fixed and rotating parts in the turbine area and improves turbine efficiency. The tubes thus cantilever the rest of the structure with the aforementioned advantages.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A gas turbine engine exhaust system symmetrical about the longitudinal centerline comprising,
   a frame having an annulus about its periphery for discharging air axially,
   tubes secured at one end to said frame to receive the air from said annulus,
   said tubes being angled in a cone pattern toward said centerline,
   a cone member secured to the tubes at the other end thereof,
   a reverse flow combustion system carried by said cone member and supported therefrom to receive the air from the tubes,
   a turbine shroud and nozzle supported from said cone member,
   an outer exhaust duct diffuser wall carried by said cone member in axial alignment with said shroud,
   an inner exhaust duct diffuser wall carried by said frame to define a curved passage with said outer wall and direct the exhaust gases across said tubes,
   a shell surrounding said tubes and supported by said frame and cone member and having an exhaust port therein,
   whereby said tubes form the main structural support for the combustion system, outer exhaust diffuser wall, and stationary turbine parts.

2. Apparatus as described in claim 1 wherein a plurality of staggered tubes are secured to said frame and said cone member and are peripherally aligned on a common pitch line with said annulus at said one end.

3. Apparatus as described in claim 2 wherein the tubes are provided with fins oriented in the direction of exhaust gas flow thereover.

4. A gas turbine engine exhaust system symmetrical about the longitudinal centerline comprising,
   a frame having an annulus about the periphery for discharging air axially,
   air conducting tubes secured at one end to a flange,
   said flange being connected to said frame at the annulus to guide air through said tubes,
   said tubes being angled in a cone pattern from said flange toward said centerline,
   a cone member angled in the opposite direction toward said centerline and secured to said tubes at the other end thereof,
   a reverse flow combustion system having concentric inner exhaust gas flow and outer compressor air flow paths in opposite directions,
   said combustion system connected to and supported by said cone member to receive the air from said tubes in said outer flow path,
   a turbine shroud and nozzle supported from said cone member and forming part of said inner flow path,
   an outer exhaust duct diffuser wall disposed radially inward of said tubes and carried by said cone member in axial alignment with said shroud,
   an inner exhaust duct diffuser wall carried by said frame to define a curved diffuser passage with said outer wall and direct the exhaust gases substantially in a reverse direction across said tubes,
   a shell surrounding said tubes and supported by said frame and cone member and having an exhaust port therein, whereby said tubes form the main structural support for the combustion system, outer exhaust diffuser wall, and stationary turbine parts.

5. Apparatus as described in claim 4 wherein a plurality of staggered tubes are secured to said flange and said cone member and are peripherally aligned on a common pitch line with said annulus at said one end.

6. Apparatus as described in claim 5 wherein the tubes are provided with fins oriented in the direction of exhaust gas flow thereover.

References Cited in the file of this patent

UNITED STATES PATENTS

| | | |
|---|---|---|
| 2,358,301 | Brauns | Sept. 19, 1944 |
| 2,410,450 | Kroon | Nov. 5, 1946 |
| 2,477,683 | Birmann | Aug. 2, 1949 |
| 2,477,798 | Griffith | Aug. 2, 1949 |
| 2,519,130 | Griffith | Aug. 15, 1950 |
| 2,553,867 | Parducci | May 22, 1951 |
| 2,587,057 | McVeigh | Feb. 26, 1952 |
| 2,594,808 | Rubbra | Apr. 29, 1952 |
| 2,875,579 | Gerdan | Mar. 3, 1959 |

FOREIGN PATENTS

| | | |
|---|---|---|
| 616,635 | Great Britain | Jan. 25, 1949 |